W. L. OFFICER.
ROPE END HEAD.
APPLICATION FILED APR. 7, 1921.

1,388,664.

Patented Aug. 23, 1921.

Inventor
W. L. Officer.

UNITED STATES PATENT OFFICE.

WYMAN L. OFFICER, OF WARREN, MINNESOTA.

ROPE-END HEAD.

1,388,664.   Specification of Letters Patent.   Patented Aug. 23, 1921.

Application filed April 7, 1921. Serial No. 459,506.

*To all whom it may concern:*

Be it known that I, WYMAN L. OFFICER, a citizen of the United States, and a resident of Warren, in the county of Marshall and State of Minnesota, have invented a new and useful Improvement in Rope-End Heads, of which the following is a specification.

This invention relates to improvements in rope-end heads, adapted for either light or heavy duty, such as a cable attachment used for mounting and effecting the sealing of a car door, or where a cable is used in place of a lead chain and the like.

The principal object of the invention is to provide a rope end head that a cable can be securely attached to it any where as well as its effective length adjusted down to a minimum.

Figure 1:
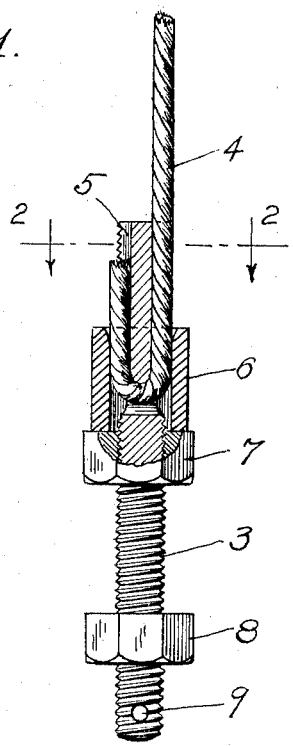
Figure 2:
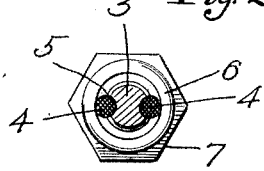

With these and other objects in view which will become apparent as the description proceeds, the invention resides in the construction, combination and arrangement of parts hereinafter more fully described and claimed, and illustrated in the accompanying drawing in which like characters of reference indicate like parts throughout the several figures, of which:

Figure 1 is a vertical sectional view of a rope-end head constructed according to my invention, and Fig. 2 is a plan view of Fig. 1 taken on the plane indicated by the line 2—2 of Fig. 1, looking in the direction indicated by the arrows.

The rope-end head includes a threaded bolt 3 with an eye in it to which a cable 4 is extended through and bent over into ridged grooves 5 by a sleeve 6 when a nut 7 is turned up against it as indicated in Fig. 1. The nut 8 is for attaching it to a lug and adjusting the effective length of the cable. This end of the bolt may be bent at right angles and keyed to a lug as I have used it on my car door. The eye 9 provides a means for keying it as well as a means for attaching a clevis to it when it is desired to use a cable for a lead chain and the like. The other end of the bolt may be flattened on two sides or carry a sort of a square head between the grooves so it can be held by a wrench for tightening the nut up against the cable.

I claim:

In a device of the class described, the combination of a threaded bolt carrying a nut and a sleeve, said bolt having an eye in it connected by ridged grooves, a cable extending through the eye and bent over into the grooves by the sleeve when the nut is turned up snug against them, and means for attaching it to a lug and adjusting the effective length of the cable down to a minimum.

WYMAN L. OFFICER.